United States Patent [19]
Redl

[11] Patent Number: 5,858,217
[45] Date of Patent: Jan. 12, 1999

[54] MULTIPLE TUBE FILTER WITH SPRAYING DEVICE

[75] Inventor: Simon Redl, Reichertshausen, Germany

[73] Assignee: Anton Steinecker Maschinenfabrik GmbH, Freising, Germany

[21] Appl. No.: 836,160

[22] PCT Filed: Oct. 31, 1995

[86] PCT No.: PCT/EP95/04275

§ 371 Date: Sep. 19, 1997

§ 102(e) Date: Sep. 19, 1997

[87] PCT Pub. No.: WO96/14127

PCT Pub. Date: May 17, 1996

[30] Foreign Application Priority Data

Nov. 3, 1994 [DE] Germany .............................. 9417636 U

[51] Int. Cl.⁶ ............................................................ B01D 29/68
[52] U.S. Cl. ........................ 210/107; 210/332; 210/354; 210/409; 210/413; 210/414
[58] Field of Search ..................................... 210/107, 332, 210/354, 409, 413, 414, 415, 323.1, 323.2; 426/11, 13, 16, 422, 271, 592

[56] References Cited

U.S. PATENT DOCUMENTS

| | | |
|---|---|---|
| 2,854,091 | 9/1958 | Roberts et al. . |
| 2,854,142 | 9/1958 | Baker ........................................ 210/332 |
| 4,834,883 | 5/1989 | Lake ......................................... 210/332 |
| 5,062,965 | 11/1991 | Bernou et al. ........................... 210/748 |
| 5,681,465 | 10/1997 | Takenoya et al. .................... 210/323.2 |

FOREIGN PATENT DOCUMENTS

| | | |
|---|---|---|
| 0 324 330 | 7/1989 | European Pat. Off. . |
| 0 460 842 | 12/1991 | European Pat. Off. . |
| 26 06 804 | 9/1977 | Germany . |

*Primary Examiner*—W. L. Walker
*Attorney, Agent, or Firm*—Seed and Berry LLP

[57] ABSTRACT

The invention pertains to a tube filter device for the filtration of beer.

In order to ensure a dependable, simple, time-saving and water-saving purification in a device of this kind, there is an inlet line underneath the tube filter with at least one rotary spray arm having upward directed spray nozzles, wherein the spray nozzles are arranged so that they generate concentric spray circles upon rotation of the spray arm, said circles are located essentially between the tube filters, and that also a drive unit is provided for rotating the spray arms.

4 Claims, 3 Drawing Sheets

MULTIPLE TUBE FILTER WITH SPRAYING DEVICE

The present invention pertains to a tube filter device for the filtration of beer with a filter cartridge that is composed of an upper part with tube filter receiving chamber and underneath that, an outlet chamber.

The use of this kind of conventional tube filter device for the filtration of beer is widespread. The conventional tube filter devices have an essentially cylindrical upper tube filter receiving chamber, in which a number of mutually separated, vertically arranged, rod-like tube filters are provided. Toward the bottom, the tube receiving chamber is formed by a tapered outlet part. Depending on the process stage, various flow media are input and output through several inlet and outlet lines which are provided primarily in the lower and in the upper region of the filter cartridge. Various processes take place in the filtration of beer. First, the filter cartridge is filled from bottom to top with water and the entire system is deaerated. Next, filtration agent, e.g., diatomaceous earth, is introduced into the filter cartridge which floats on the tube filter. In a filtration prephase, the water is forced by the beer from bottom to top out of the filter cartridge, and filtration agent is added in. In a subsequent phase, the actual filtration occurs, in which beer is forced from bottom to top through the tube filter with further addition of filtration agent. Next, the water present in the filter cartridge is displaced by air. The dry filter cake is then knocked off the tube filter, whereupon the filtration agent is removed through another outlet line. Usually, the filter cartridge is filled repeatedly with water and then emptied in order to remove the remaining contamination with filtration agent. However, this process is time-consuming and is associated with a high water consumption.

It has already been proposed to provide a spray strip on the underside of the separating wall to which the tube filters are suspended and to spray water horizontally onto the tube filters for cleaning. However, a disadvantage of this arrangement is that the tube filters cover each other, so that the spray water does not get to all candles, which, in turn, means an unreliable cleaning. But reliable cleaning is indispensable in a beer brewery. Another disadvantage of this device is that the underside of the separating wall and also the cartridge wall are not cleaned of the deposits.

Therefore the present invention is based on the problem of designing a tube filter device that allows a reliable, simple, time-saving and water-saving cleaning.

According to this invention the problem is solved in that underneath the tube filters a supply line with at least one rotary-seated spray arm, which has upward directed spray nozzles, is provided, wherein the spray nozzles are positioned so that during rotation of the spray arm, they produce concentric spray circles which are located essentially between the tube filters, and that also a drive unit is provided for rotation of the spray arms.

The device according to this invention has the advantage that the water from the spray nozzles is sprayed between the tube filters on the underside of the separating wall, so that residual filtration agent is reliably detached and is rinsed off together with the downward flowing water. This arrangement of the spray nozzles assures that the water will cover all gaps between the tube filters. For example, the tube filters are cleaned by the water sprayed upward against the separator wall and dropping off downward, whereby all residues of the filtration agent which have settled on the tube filters are detached and rinsed off downward. Since the water is sprayed upward in the region of the side walls and runs off from them, the side walls of the filter container are cleaned in a dependable manner. Because the filter cartridge need not be entirely filled with water, but rather merely small quantities of spray water are needed, significant water and production costs can be saved. Since the spray arms can rotate with the spray nozzles, the number of the spray nozzles needed to clean the tube filter sufficiently, will be minimized.

According to a preferred embodiment of the present invention, the supply line extends along the middle axis of the filter cartridge, with two opposing spray arms extending radially outward. This arrangement results in an equalization of forces, so that there is no unilateral lever loading. Thus, a uniform, calm and smooth rotation of the spray arms results. Due to the uniform loading, the wear is also decreased, so that again, maintenance and repair costs are reduced to a minimum. This arrangement also makes it possible that the spray nozzles can be distributed to the opposing spray arms so that one spray nozzle will produce one spray circle.

In another favorable configuration of the invention, at least one horizontally directed opening is provided on a longitudinal side of at least one spray arm as drive unit for the spray arms, so that liquid moves through the inlet line through the horizontally directed opening and thus drives the spray arms by means of recoil. The spray arms are driven like a water wheel by the water exiting from the horizontally directed openings in this simple and low-cost manner. Thus, no complicated mechanical or electrical drive unit is needed, which, in turn, reduces the manufacturing costs for the tube filter device according to this invention.

The invention will be described below with reference to the design embodiment represented in the figures.

Figure 1:
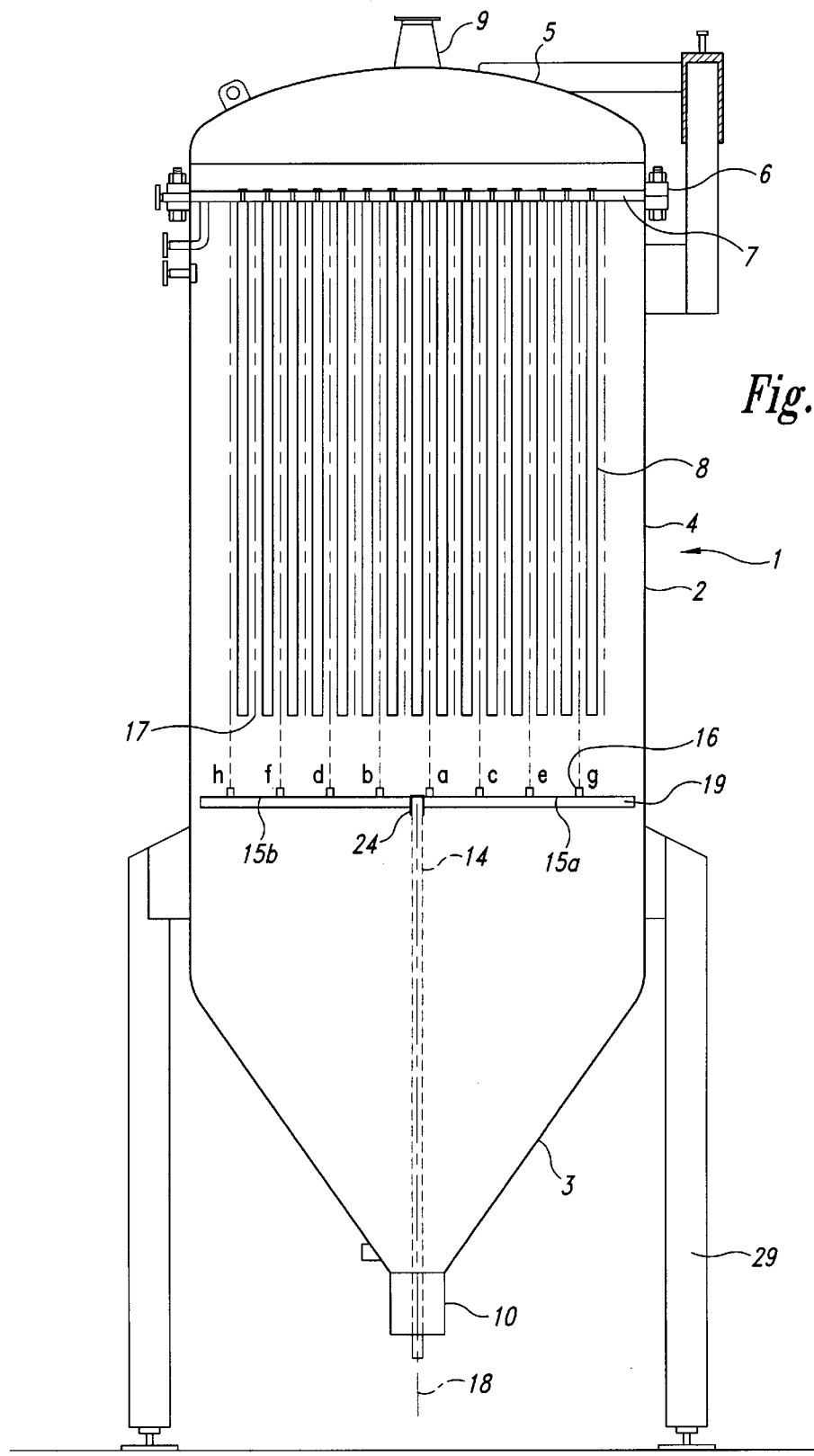
FIG. 1 shows a schematic, longitudinal cross section through a filter cartridge according to a first embodiment of the present invention.

FIG. 1 shows a first embodiment of the invented tube filter device for the filtration of beer. The tube filter device 1 is formed essentially of a filter cartridge 2, which, in turn, has a container cover 5, and an adjoining, essentially cylindrical tube filter receiving chamber 4 and then further downward, an essentially conically tapered outlet region 3. There are central inlet and outlet flanges 9, 10 attached to the top of the cartridge cover 5 and underneath at the mouth of the outlet region 3. To the side of the lower region of the cylindrical cartridge section there are rod-like or tubular support feet 29 distributed uniformly along the perimeter as a stand.

Between the cartridge cover 5 and the tube filter receiving chamber 4 there is a separating wall 6 provided with drilled holes. At each of the numerous transit openings 7 distributed along the surface of the separating wall 6 there is a downward pointed rod-like candle 8 as a filter element. The filter cartridge 2 is initially cylindrically downward past the length of the candle 8.

Below the tube filter 8 an inlet line 14 for cleaning water is provided, at whose upper end there are two equal-length spray arms 15a and 15b, which are rotary mounted, as will be explained below in connection with FIG. 3. On their upper side, the two spray arms have upward-directed spray nozzles 16, and the spray water which moves along the inlet line 14 into the arms 15a, b, can be sprayed through the spray nozzles 16 between the tube filters 8. As drive unit for the spray arms 15a, b, initially a horizontally directed opening 19 is provided on each of the equal longitudinal sides of the spray arms 15 so that liquid moves through the inlet line 14 through the opening 19, so that the spray arms 15a, b are set in rotation due to the recoil force of the water. It is also possible to use an electromotor as drive unit.

Figure 2:
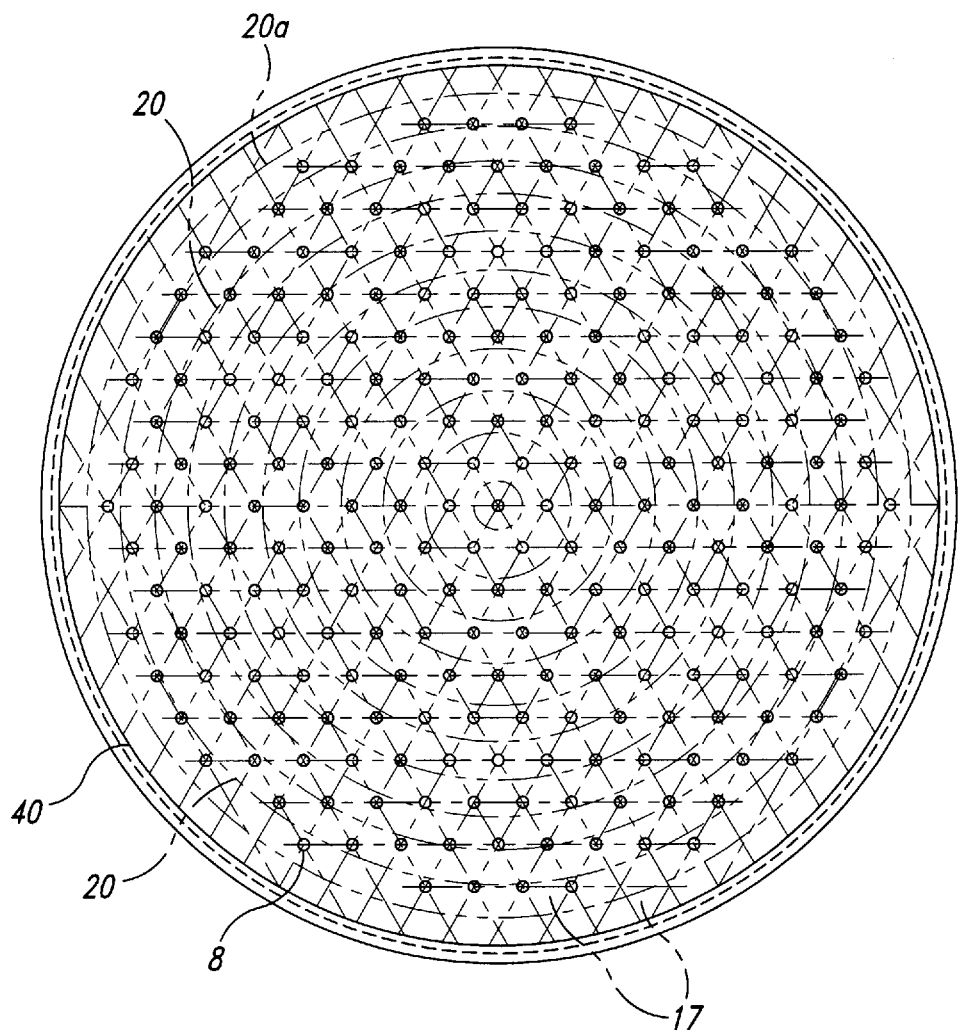
FIG. 2 shows a cross section through a tube filter device.

The spray nozzles 16 are distributed along the entire length of the two arms 15a and b. As is evident from FIG. 1, the spray nozzles 16 are located opposite the gaps of the individual tube filters 8. As is indicated in FIG. 2, the spray nozzles 16, upon rotation of the spray arms 15a, b, produce concentric spray circles 20. From FIG. 2 it is evident that the concentric circles are located essentially between the tube filters 8, due to the arrangement of the spray nozzles 16. The individual tube filters are mutually offset and placed in parallel rows. All tube filters can be easily reached on all sides by the spray water. The water from the spray nozzles 16 can be sprayed along the gaps 17, externally at the tube filters 8, along the underside of the separating wall 6, in order to clean them. The concentric spray circles 20 are arranged so that the water is sprayed essentially onto the regions of the separating wall 6 where no tube filters are located. The spray water can then run off downward along the tube filters 8 and carry off the loosened, residual filtration agent detached from the separating wall. In addition, the water from the outside spray circle 20a also sprays upward between the filter cartridge wall 40 and candles 8 and runs down it so that the filter cartridge wall 40 is cleaned. The number and placement of the spray nozzles 16 depend on the number and placement of tube filters, so that water can be sprayed both between the tube filters 8 and also between tube filters 8 and wall 40. It is particularly advantageous when the spray water is sprayed by means of a control device from the nozzles 16 upward at intervals. Then the spray water, in which the deposits are dissolved, can run off along the candles and the filter cartridge wall, before new spray water is sprayed from the spray nozzles 16. Thus an effective and water-saving cleaning is obtained.

In the design example shown in FIG. 1, the spray nozzles are distributed in such a manner that one spray nozzle 16 generates one spray circle 20. Thus, the spray nozzle 16a located on the spray arm 15a produces the smallest of the concentric circles, whereas the spray nozzle 16b, which is located on the opposing arm 15b, generates the next larger, concentric circle. The following concentric circles are then formed in series, one after the other, from the spray nozzles 16c, d, e, f, g, h, with the spray nozzles corresponding to the neighboring spray nozzles located on the opposing spray arms 15a, b. The outermost spray nozzle 16h produces the spray circle 20a, which surrounds the tube filter device and is located between the outer tube filter 8 and the filter cartridge wall 40. Of course, it is also possible to provide one spray nozzle 16 per spray circle, both on the spray arm 15b and also on the spray arm 15a.

Figure 3:
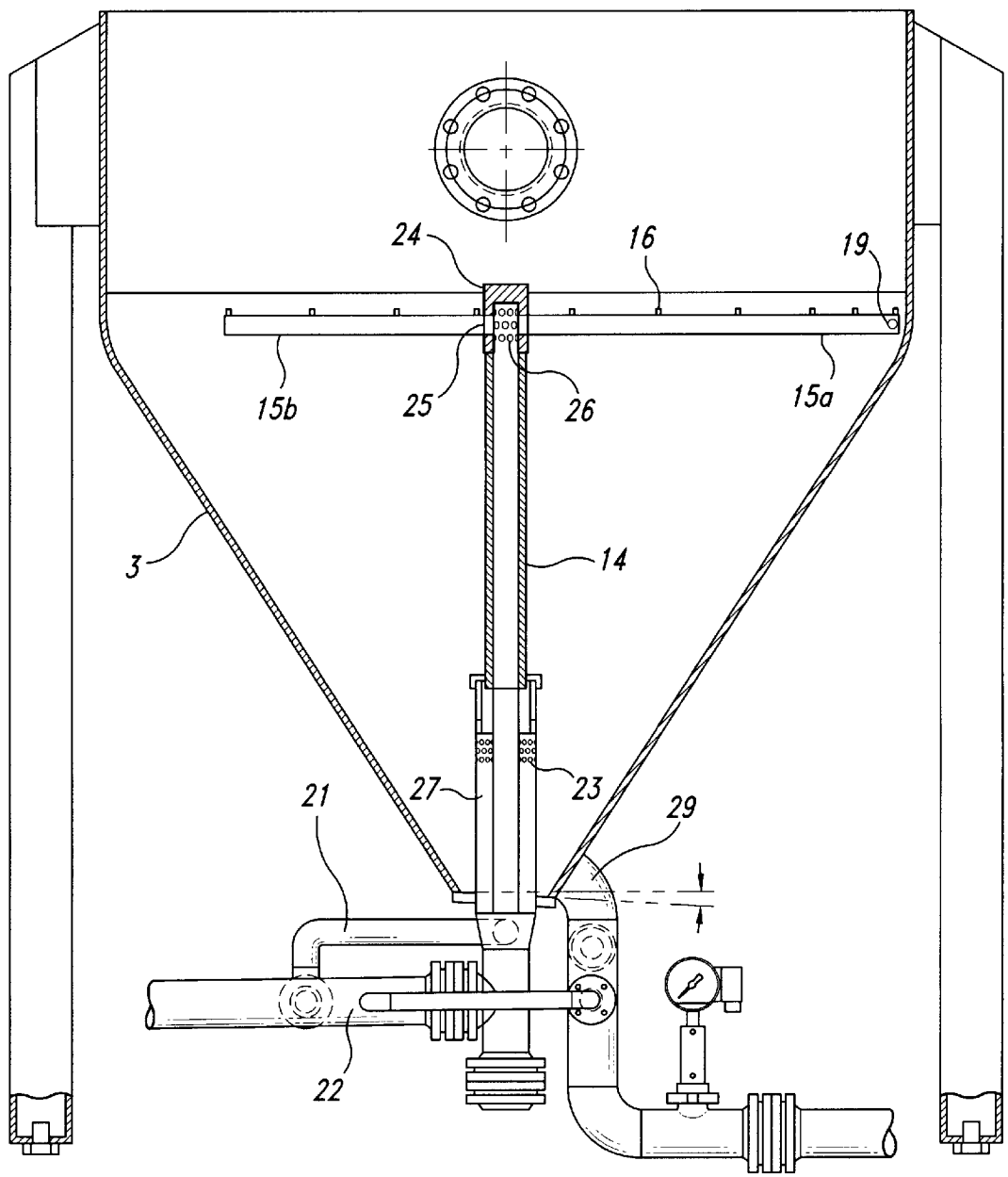
FIG. 3 shows a partial longitudinal cross section through a filter cartridge according to another embodiment of the present invention.

FIG. 3 shows a partial cross section through another embodiment of the present invention, which corresponds essentially to the embodiment shown in FIG. 1. But in this embodiment, the spray arm 15a is made longer than the spray arm 15b. The spray arms 15a and b can rotate about the flange bushing 24, which is attached to the upper end of the inlet 14. Water is directed through the external inlet line 21 to the inlet 14 and passes through the outlet holes 26 in the inlet and moves through a transit opening 25 of the tight bushing into the interior of the spray arms 15a and b and can thus be sprayed through the spray nozzles 16, as already described in detail, to the tube filters 8. In addition, the inlet water is sprayed from the horizontally directed opening 19, so that the arms are driven. A horizontally directed drive opening is provided in the same way on the arm 15b. Rinse water and filtration agent can be drained through the outlet line 29. Furthermore, in FIG. 3 we see the additional inlet 22 that is used, for example, for inputting water, beer or diatomaceous earth. The liquid moving through this inlet 22 flows past the inlet 14 into the ascending distribution tube 27 and can enter through outlet holes 23 into the filter cartridge.

I claim:

1. Tube filter device for the filtration of beer with a filter cartridge that is composed of an upper part with tube filter receiving chamber having tube filters therein and underneath that, an outlet chamber, characterized in that underneath the tube filters there is an inlet line with at least two rotary spray arms having upward-directed spray nozzles with one spray arm being longer than the opposing spray arm, whereby the spray nozzles are arranged so that they generate concentric spray circles upon rotation of the spray arm, said circles are located essentially between the tube filters, and that also a drive unit is provided for rotating the spray arms.

2. Tube filter device according to claim 1, characterized in that the inlet line extends along the middle axis of the filter cartridge and the two opposing spray arms extend radially outward.

3. Tube filter device according to claim 2, characterized in that the spray nozzles are distributed along the opposing spray arms such that one spray nozzle produces one spray circle.

4. Tube filter device according to claim 1, characterized in that as drive unit for the spray arms at least one horizontally directed opening is provided on one longitudinal side of at least one spray arm such that liquid moves via the inlet line through the horizontally directed opening and thus drives the spray arms by means of recoil.

* * * * *